UNITED STATES PATENT OFFICE.

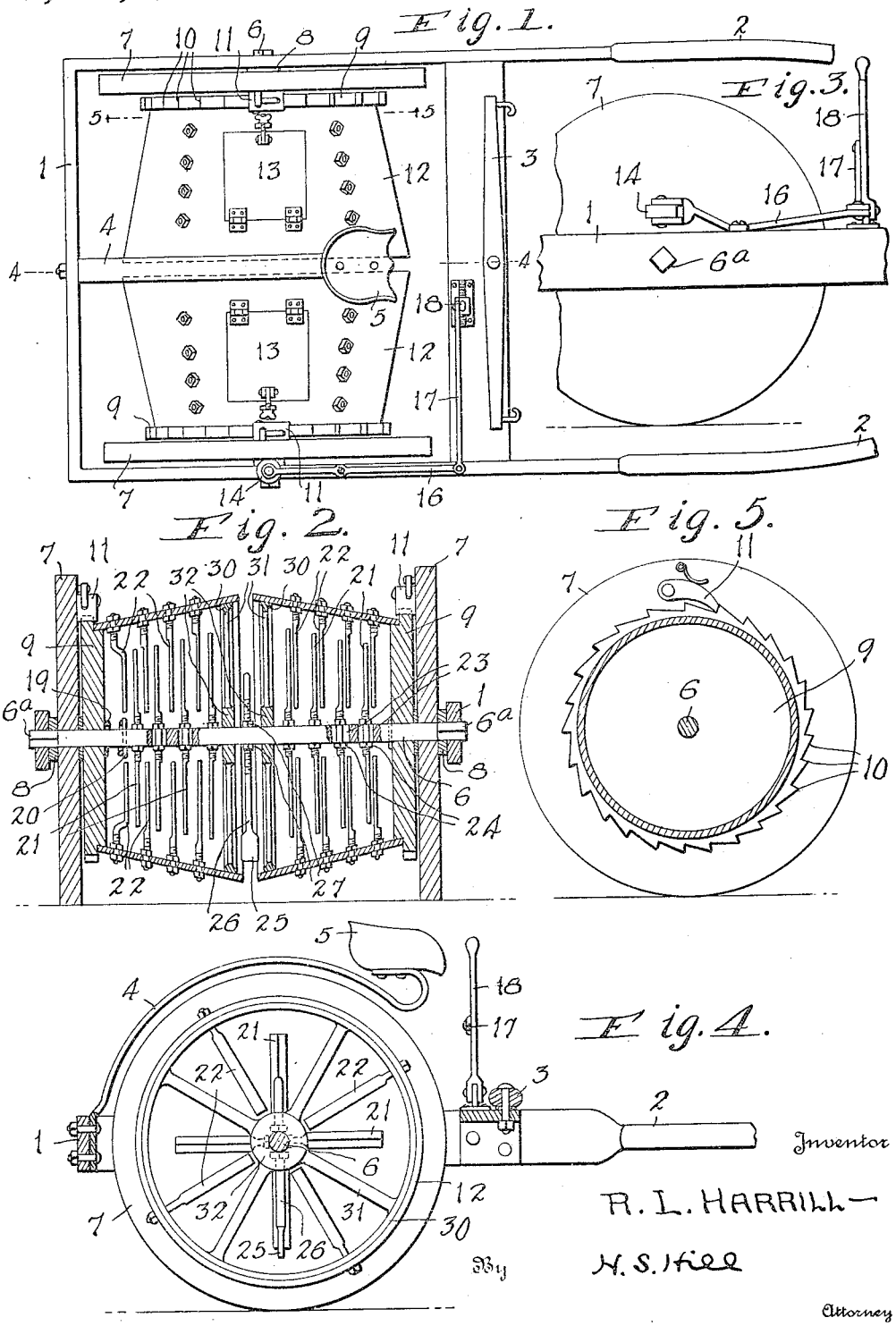

ROBERT LEE HARRILL, OF LATTIMORE, NORTH CAROLINA.

MANURE-DRILL.

1,224,538.  Specification of Letters Patent.  Patented May 1, 1917.

Application filed December 7, 1916. Serial No. 135,601.

*To all whom it may concern:*

Be it known that I, ROBERT LEE HARRILL, a citizen of the United States, residing at Lattimore, in the county of Cleveland, State of North Carolina, have invented a new and useful Manure-Drill; and I do hereby declare the following to be a full, clear, and exact description of the invention, such as will enable others skilled in the art to which it appertains to make and use the same.

The present invention relates to a rolling hopper manure drill or fertilizer, and has for its object to provide a device of this character which embodies novel features of construction whereby the manure or fertilizer is effectively broken up before being distributed, and which enables the distribution of the fertilizer to be controlled at all times by the operator.

Further objects of the invention are to provide a device of this character which is comparatively simple and inexpensive in its construction, which can be easily filled with fertilizer and drawn across the field, which has no delicate parts such as are liable to get out of adjustment and repair, and which can be regulated to discharge a larger or smaller amount of the fertilizer as desired.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Figure 1 is a top plan view of a rolling hopper fertilizer distributer constructed in accordance with the invention.

Fig. 2 is a longitudinal sectional view through the rolling hopper, the frame and supporting wheels of the drill appearing in section.

Fig. 3 is a fragmentary side elevation of one side of the drill, showing the shifting lever which is provided for moving one of the hopper sections toward and away from the other hopper section to control the size of gap between the two hopper sections.

Fig. 4 is a vertical longitudinal sectional view taken on the line 4—4 of Fig. 1.

Fig. 5 is a sectional view taken on the line 5—5 of Fig. 1.

Corresponding and like parts are referred to in the following description and indicated in all the views of the drawings by the same reference characters.

Referring to the drawings which illustrate one embodiment of the invention, the numeral 1 designates the main frame of the manure drill, said frame being substantially rectangular in shape, and being provided with the forwardly extending shafts 2 for use in attaching a draft animal to the device. The conventional swingletree 3 is shown as mounted upon the front cross bar of the rectangular frame, while a spring seat bar 4 projects upwardly and forwardly from the rear cross bar and has a seat 5 mounted upon the forward end thereof. A horizontal axle 6 extends transversely across the main frame 1, said axle being locked against rotation and having the supporting wheels 7 journaled thereon. In the present instance the extremities 6$^a$ of the axle are polygonal in cross section and fitted within corresponding openings in the side bars of the main frame 1 so that there will be no danger of the axle rotating when the machine is in operation. Suitable spacing plates or washers 8 are interposed between the side bars of the frame 1 and the supporting wheels 7. A disk 9 is journaled upon the axle 6 adjacent the inner face of each of the supporting wheels 7, the peripheries of the disks being provided with ratchet teeth 10 which are arranged to be engaged by spring actuated pawls 11 upon the supporting wheels 7 to lock the disks with the wheels when the machine is advanced in a forward direction. However, if the machine is backed, the pawls 11 will slip over the inclined faces of the ratchet teeth 10 to permit of the wheels turning independently of the disks. Rigid with each of the disks 9 is a drum member or hopper section 12, said hopper sections flaring toward the inner open ends thereof which have an opposed relation to each other. These flared inner ends of the hopper sections 12 are shown as provided with reinforcing bands 30 which are connected by spokes 31 to hub members 32 which are loose upon the axle 6. The hopper sections are thus properly supported at both ends so as to be maintained at all times in proper position and relation to each other. Each of the hopper sections is provided in one side thereof with a door 13 which can be readily opened for the purpose of filling the hopper section with manure or fertilizer. When the machine is advanced in a forward direction the two hopper sections rotate in unison and the manure or fertilizer is fed in a steady stream through the space or gap between the opposed inner ends of the hopper sections.

One of the supporting wheels 7, together with the corresponding disk 9 and hopper section 12, is slidable upon the shaft 6, being engaged upon the outer face thereof by a roller 14 at the rear end of a forwardly extending shifting lever 16, said lever being pivoted upon the main frame 1 at an intermediate point between its ends and having its forward end connected by a transverse link 17 to an operating lever 18 which is mounted upon the main frame in front of the seat 5 so as to be readily manipulated by an operator seated thereon. With this construction it will be obvious that by moving the lever 18 and sliding the supporting wheel 7 and corresponding hopper section 12 the amount of the gap or space between the opposed open inner ends of the hopper sections 12 can be increased or decreased as may be found necessary to control the distribution of the manure or fertilizer in the manner desired. The inner face of the rotatable disk 9 is engaged by one end of a coil spring 19 which surrounds the axle 6, the other end of the said spring engaging a pin or abutment 20 on the axle so that the spring normally tends to slide the disk and supporting wheel outwardly and thereby increase the gap or space between the hopper sections. By manipulating the lever 18, however, the hopper section can be moved inwardly against the action of the spring 19, and the spring serves to take up any looseness of the members.

Radial blades 21 are shown as projecting diametrically from opposite sides of the axle 6 and arranged for coöperation with corresponding inwardly extending plates 22 upon the hopper sections to break up the manure or fertilizer as the hopper sections revolve. The shanks of the radial blades 21 are adjustably received within longitudinal slots 23 in the axle, being rigidly clamped in adjusted positions by means of the nuts 24. This admits of the blades 21 being set closer to or farther away from the blades 22 of the hopper sections as may be required to operate upon the particular manure or fertilizer in the most effective manner.

Arranged within the rolling hopper at a point directly above the lowermost point of the central gap between the hopper sections is a fixed blade 25 which serves to retard the manure or fertilizer and cause it to drop through the gap of the rolling hopper in a uniform stream, thereby depositing fertilizer in the most advantageous manner. This fixed blade 25 is carried by a vertical stem or arm 26 which extends through an opening in the axle 6 and is threaded to receive the nuts 27. This construction admits of the fixed retarding blade 25 being raised or lowered, and by tightening the nuts 27 it can be rigidly clamped in an adjusted position.

When the machine is advanced in a forward direction the pawls 11 engage the ratchet teeth 10 of the disks 9 so that the two hopper sections are rotated in unison with each other. The manure or fertilizer within the hopper sections is acted upon by the coöperating blades 21 and 25 and thereby broken up before being discharged. Owing to the fact that the sides of the hopper sections 12 are separated toward the open ends thereof the manure or fertilizer works its way toward the center of the rolling hopper as the latter revolves. At this point it is engaged by the fixed retarding blade 25 and caused to drop through the gap or space between the hopper sections. Should it be desired to deposit a smaller quantity of manure or fertilizer the lever 18 is manipulated to decrease the size of the gap, while should a heavier deposit of fertilizer be desired the lever is manipulated to increase the size of the gap. When the machine is moved backwardly the pawls 11 will slip over the ratchet teeth 10 and permit the supporting wheels to turn independently of the hopper sections. Also, when moving the machine from place to place the pawls 11 can be swung upwardly into an inoperative position, the gap between the hopper sections being closed, so that the hopper will not rotate and there will be no loss of fertilizer or unnecessary strain upon the draft animal.

Having thus described the invention, what I claim as new and desire to secure by Letters Patent, is:—

1. A fertilizer drill including a frame, a transverse shaft extending across the frame, a pair of supporting wheels mounted upon the shaft, complemental hopper sections operatively connected to the supporting wheels and formed with open inner ends which have an opposed relation to each other and are separated by a gap through which the fertilizer is discharged as the hopper sections rotate, and shifting means for moving one of the supporting wheels and the corresponding hopper section to vary the size of the gap between the hopper sections.

2. A fertilizer drill including a frame, a transverse fixed shaft upon the frame, a pair of supporting wheels journaled upon the transverse shaft, complemental hopper sections operatively connected to the supporting wheels and flared toward the inner ends thereof which are open and have an opposed relation to each other, a gap being normally provided between the flared open ends of the hopper sections to permit of the discharge of the fertilizer, and a shifting lever for sliding one of the supporting wheels and corresponding hopper section upon the shaft to vary the size of the gap between the hopper sections.

3. A fertilizer drill including a frame, a fixed transverse shaft upon the frame, a pair of supporting wheels journaled upon the shaft, disks loose upon the shaft and having pawl and ratchet connections with the respective supporting wheels, complemental hopper sections carried by the disks and formed with open inner ends which have an opposed and normally spaced relation to provide a gap through which the fertilizer is discharged, coöperating blades projecting from the shaft and hopper sections for reducing the fertilizer within the hopper sections, and means for adjusting the relation between the hopper sections to vary the size of the gap between the open ends thereof.

4. A fertilizer drill including a frame, a transverse fixed shaft thereon, a pair of supporting wheels journaled upon the fixed shaft, disks loose upon the shaft and having pawl and ratchet connections with the respective supporting wheels, complemental hopper sections carried by the disks and flared toward the inner ends thereof which are open and having an opposed and normally spaced relation to provide a gap through which the fertilizer is discharged, coöperating blades projecting from the shaft and hopper sections for reducing the fertilizer within the hopper sections, a fixed retarding blade arranged within the hopper over the bottom of the gap between the hopper sections to produce a uniform discharge of the fertilizer through the gap, and a shifting lever for moving one of the supporting wheels and the corresponding hopper section to vary the size of the gap between the open inner ends of the hopper sections.

5. A fertilizer drill including a frame, a fixed transverse shaft extending across the frame, a pair of supporting wheels journaled upon the shaft, disks loose upon the shaft and having pawl and ratchet connections with the respective supporting wheels, complemental hopper sections carried by the disks and formed with flared inner ends which are open and have an opposed and normally spaced relation to each other to provide a gap through which the fertilizer is discharged, a fixed retarding blade arranged within the hopper directly above the bottom of the gap between the hopper sections, means for adjustably supporting the retarding blade so that it can be raised and lowered, and a shifting lever for sliding one of the supporting wheels upon the axle to vary the size of the gap between the hopper sections.

In testimony whereof I have signed my name to this specification in the presence of two subscribing witnesses.

ROBERT LEE HARRILL.

Witnesses:
S. G. PRICE,
A. M. LATTIMORE.

Copies of this patent may be obtained for five cents each, by addressing the "Commissioner of Patents, Washington, D. C."